3,265,727
PHENYL ALKYL-1,2 DICARBAMATES
Charles D. Bossinger, Kankakee, and Kelley G. Taylor, Decatur, Ill., assignors to Armour Pharmaceutical Company, Chicago, Ill., a corporation of Delaware
No Drawing. Filed June 26, 1962, Ser. No. 205,199
3 Claims. (Cl. 260—482)

This application is a continuation-in-part of copending application Serial No. 729,554, filed April 21, 1958 and of Serial No. 38,763, filed June 27, 1960, now abandoned. Application Serial No. 38,763 was a continuation-in-part of application Serial No. 729,553, filed April 21, 1958, now abandoned, and applications Serial Nos. 729,553 and 729,554 were continuations-in-part of parent application Serial No. 554,132, filed December 20, 1955, now abandoned.

This invention relates to certain dicarbamate compounds and to a method of treating the central nervous system by administering these compounds. The novel compounds of this invention can be classified generally as phenyl alkyl dicarbamates.

It is an object of this invention to provide carbamate compounds for use in treating the central system. More specifically, it is an object to provide carbamate compounds which exhibit special and distinctive properties, or combinations of properties in the treatment of the central nervous system. For example, it is an object to provide carbamate compounds which function primarily as muscle relaxants, and which exhibit relatively little sedative effect. Further objects and advantages will be indicated in the following detailed specification.

The phenyl alkyl dicarbamate compounds which are useful in the treatment of the central nervous system in accordance with the present invention are characterized by the following structural formula:

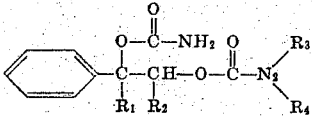

In the foregoing formula, $R_1$ is either hydrogen or an alkyl group containing from 1 to 3 carbon atoms, $R_2$ is either hydrogen or an alkyl group containing from 1 to 3 carbon atoms; and $R_3$ and $R_4$ are either hydrogen or methyl. For one preferred sub-class of compounds $R_1$ is hydrogen, $R_2$ is hydrogen or an alkyl group containing from 1 to 3 carbon atoms, and $R_3$ and $R_4$ are hydrogen.

Examples of such preferred compounds are 1-phenyl ethyl-1,2-dicarbamate, 1-phenyl propyl-1, 2-dicarbamate and 1-phenyl butyl-1,2-dicarbamate. Other compounds coming within the scope of the present invention are 2-phenyl propyl-1,2-dicarbamate, 2-phenyl butyl-1,2-dicarbamate, 2-phenyl butyl-2,3-dicarbamate, 2-phenyl pentyl-2,3-dicarbamate and 3-phenyl pentyl-2,3-dicarbamate.

The foregoing dicarbamate compounds can be prepared readily from the corresponding monocarbamate compounds. For example, 1-phenyl ethyl-1,2-dicarbamate can be prepared from 2-hydroxy-2-phenyl ethyl carbamate. The intermediate monocarbamate will contain a hydroxyl group bonded to the same carbon atom as the phenyl group. Such monocarbamates can be prepared by the process described in application Serial No. 816,700, filed May 29, 1959, now Patent No. 3,066,164. In the procedure of this application, a 1,2-glycol is converted to the corresponding carbonate, and the carbonate is subjected to ammonolysis to obtain the desired carbamate. Preferably, 1,2-glycol is condensed with a halo-formic ester to obtain an acyclic carbonate which is then subjected to ammonolysis to obtain the monocarbamate. The intermediate monocarbamate can be converted to the dicarbamate by reaction with phosgene and ammonolysis. For example, the carbonyl chloride derivative can be reacted with diethyl aniline, and then with concentrated ammonium hydroxide. Since the particular process for preparing the dicarbamate compounds does not form a part of the present invention, it is not believed it will be necessary to further describe such processes herein, except as illustrated by the following examples.

In utilizing the compounds of this invention for central nervous system treatment and particularly to promote muscle relaxation, it is preferred to administer the compounds orally. Since the compounds are well-absorbed orally, it will usually not be necessary to resort to parenteral administration. For oral administration, it is preferred to combine the dicarbamate compounds with a pharmaceutical carrier. The proportions of the carrier and dicarbamate compound are not critical, and they vary considerably depending whether the composition is to be filled into capsules or formed into tablets. In tableting, it will usually be desirable to employ at least as much of the pharmaceutical carrier as the dicarbamate compound. Various edible pharmaceutical carriers, or mixtures thereof can be used. For example, a mixture of lactose, dibasic calcium phosphate, and cornstarch is suitable. Additional ingredients can be included, such as lubricants like magnesium stearate.

When administering the compounds of this invention orally for central nervous system treatment, the total daily dose will usually fall within the range from 400 to 2,000 milligrams of the dicarbamate compound per 24 hour period. Typically, the daily dose will range from 600 to 1,600 milligrams. In some cases, it may sometimes be desirable to administer as much as 2,400 milligrams per day. In practicing the method of this invention, it will therefore be convenient to have the dicarbamate compound combined with a pharmaceutical carrier, such as lactose, and prepared in tablets or other dosage unit form. Each tablet or dosage unit can contain from 50 to 600 milligrams of the dicarbamate compound. For example, tablets containing 200 milligrams of the dicarbamate compound can be administered either 1 tablet three times a day to achieve a daily dose of 600 milligrams or up to 2 tablets four times a day to achieve a daily dose of 1,600 milligrams.

The present invention is further illustrated by the following specific examples.

EXAMPLE 1

The following method was utilized in preparing 2-hydroxy-2-phenyl ethyl carbamate:

A solution of 32.0 gms. (0.3 mole) of phosgene in 200 ml. of benzene was added dropwise to a stirred solution of 44.2 gms. of styrene glycol (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water.

To the benzene-soluble fraction was added 500 ml. of a 30% aqueous ammonium hydroxide solution, and thereafter the resulting mixture was maintained at a temperature of 5° C. for a period of 3 hours. Upon standing, needle-shaped crystals were formed, and such crystals were separated from the mother liquor. Crystallization can be facilitated by the removal of excess ammonia from the crystallization mixture under reduced pressure. The yield of crystals was 30 gms. An additional amount of reaction product was recovered from this mother liquor. The combined yield, after recrystallization from chloroform, was 40.5 gms. The melting point of the reaction product was 111–112° C.

This reaction product was subjected to analysis, and the results were as follows.

Calculated: C, 59.65; H, 6.12; N, 7.73. Analyzed: C, 59.55, 59.75; H, 6.15, 6.17; N, 7.67, 7.54.

EXAMPLE 2

The following method was utilized in the preparation of 1-phenyl ethyl-1,2-dicarbamate from 2-hydroxy-2-phenyl ethyl carbamate prepared as described in Example 1.

A solution of 32.0 gms. (0.3 mole) of phosgene in 200 ml. of benzene was added dropwise to a stirred solution of 54.3 gms. of 2-hydroxy-2-phenyl ethyl carbamate (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water.

To the washed benzene layer was added 500 ml. of a 30% aqueous ammonium hydroxide solution, and thereafter the resulting mixture was maintained at a temperature of 5° C. for a period of 3 hours. The white precipitate thereupon formed was separated from the mother liquor and recrystallized from chloroform containing a minor portion of acetone. The yield of crystalline product was 10 gms. having a melting point of 166–7° C.

This reaction product was subjected to analysis and the results were as follows.

Calculated: C, 53.57; H, 5.36; N, 12.5. Analyzed: C, 53.59, 53.40; H, 5.56, 5.41; N, 12.54, 12.40.

EXAMPLE 3

1-phenyl-1,2-propanediol, 15.2 g. (0.1 mole) was dissolved in 25 ml. of pyridine dried over NaOH. To this chilled solution with stirring was added, dropwise, 19.3 g. (0.11 mole) of phenyl chlorocarbonate in half an hour. Stirring was continued at room temperature for another two hours. Ether, 100 ml., and then ice cold water, 50 ml. were added. The ether layer was separated, washed with 50 ml. of cold hydrochloric acid twice, 50 ml. cold water once, 50 ml. of cold 10% NaHCO$_3$ twice, 50 ml. cold water once, and dried over anhydrous CaCl$_2$. The dried ether solution was poured into 100 ml. of anhydrous NH$_3$. The reaction mixture was stirred for three hours. Ammonia was then allowed to evaporate overnight.

The ether solution was washed with 50 ml. of water three times, 50 ml. of 5% NaOH twice, 50 ml. of water twice, and dried. After ether was stripped off, an attempt was made to recrystallize the residue from 3 liters of benzene. All would not go into solution. After cooling, a solid, 3.0 g., M.P. 213–17°, was isolated by filtration. It was recrystallized from acetone to give 1,2-dicarbamyl-1-phenyl propane, M.P. 225–226°.

EXAMPLE 4

To a stirred solution of 176.6 g of styrene glycol (1.28 mole) in 2400 ml. of benzene was added, dropwise, a solution of 128 g. of phosgene (1.2 mole) in 800 ml. of benzene. The temperature was maintained at 30° C. After the addition was completed, the reaction mixture was stirred for another hour. Diethylaniline 192 g. in 200 ml. of benzene was then added. After an additional hour of stirring, 2 liters of water was added. The benzene layer was separated and washed with water.

One fourth of this benzene solution which contained approximately 0.3 mole of the chlorocarbonate was placed in a three-necked flask, fitted with a mechanical stirrer, an addition funnel, and a condenser. While stirring at ice-bath temperature, 500 ml. of 40 percent dimethylamine was added. Stirring was continued for two hours. The reaction mixture was allowed to warm up to room temperature overnight.

The benzene layer was separated and evaporated under reduced pressure. The residual brown oil was distilled twice under reduced pressure to give an oil, 42 g. B.P. 130°/150 mg. yield 66 percent.

To a stirred solution of 21 g. of this oil in 200 ml. of benzene was added, gradually 15 g. of phosgene in 170 ml. of benzene. After thirty minutes, diethylaniline 19 g. was added slowly. Stirring was continued for two and one-half to three hours at room temperature. The reaction mixture was then cooled to 5° C. After it was washed with ice water, 170 ml. of 30 percent NH$_4$OH was added. The reaction mixture was stirred at 5° C. for one and one-half hours and left standing overnight at room temperature.

The aqueous layer was separated. Ammonia was removed under reduced pressure without applying external heat. A solid, 12.7 g. was isolated by filtration. After drying in a vacuum desiccator over CaCl$_2$ for twenty-four hours, the solid melted at 143–145° C. It was recrystalized from benzene and petroleum ether (20–40° C.) to give crystals, 11.7 g. of 2-(N,N-dimethyl carbamyloxy)-1-phenylethyl carbamate M.P. 149–150° C.

EXAMPLE 5

Tablets for oral administration were prepared from 1-phenyl ethyl-1,2-dicarbamate. This compound was combined with a mixed pharmaceutical carrier in the ratio of 2 parts by weight of the dicarbamate compound per 3 parts of the pharmaceutical carrier. The mixed carrier contained dibasic calcium phosphate as the principal ingredient together with smaller amounts of lactose and 1 part of cornstarch. A small amount of magnesium stearate was also included.

The dicarbamate compound, the calcium phosphate, the lactose, and part of the magnesium stearate were blended and dry mixed until a uniform composition was obtained. This was formed into firm slugs no greater than ¼ inch thick. The slugs were then put through an oscillating granulator equipped with a 10 mesh screen. The cornstarch and a little more magnesium stearate was added at intervals while the slugs were being sized. The granulation was blended in a drum tumbler for 30 minutes. Following this, the granulation was compressed into tablets of 500 mg. per tablets containing 200 milligrams of the carbamate compound.

While in the foregoing specification this invention has been described in relation to certain preferred embodiments, and many details have been set forth for purpose of illustration, it will be apparent to those skilled in the art that the invention is susceptible to additional embodiments, and that certain of the details set forth herein can be varied considerably without departing from the basic principles of the invention.

We claim:

1. Phenyl alkyl dicarbamate compounds characterized by the structural formula

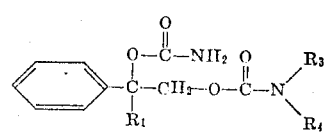

wherein R$_1$ is selected from the class consisting of hydrogen, and an alkyl group containing 1 to 3 carbon atoms and R$_3$ and R$_4$ are selected from the class consisting of hydrogen and methyl.

2. The compound 1-phenyl ethyl-1,2-dicarbamate.

3. The compound 2-(N,N-dimethyl carbamyloxy)-1-phenylethyl carbamate.

References Cited by the Examiner

UNITED STATES PATENTS

| 2,627,524 | 2/1953 | Malkemus | 260—482 |
| 2,656,378 | 10/1953 | Berger et al. | 260—482 |
| 2,890,984 | 6/1959 | Sahyun | 167—65 |
| 2,934,559 | 4/1960 | Beinfest | 260—482 |
| 2,967,880 | 1/1961 | Finke et al. | 260—482 |
| 2,978,489 | 4/1961 | Frankel | 260—482 |
| 3,036,954 | 5/1962 | Robbins | 167—65 |

FOREIGN PATENTS 218,080 7/1957 Australia.

LORRAINE A. WEINBERGER, Primary Examiner.

MORRIS O. WOLK, LEON ZITVER,
 Primary Examiners.

P. SABATINE, D. P. CLARKE, A. P. HALLUIN,
 Assistant Examiners.